United States Patent [19]

Akman et al.

[11] Patent Number: 5,519,772
[45] Date of Patent: May 21, 1996

[54] NETWORK-BASED TELEPHONE SYSTEM HAVING INTERACTIVE CAPABILITIES

[75] Inventors: Aaron A. Akman, Edison; Patrick J. Donnelly, Bridgewater; Steven A. Hollenbach, Neshanic Station; Michael A. Kret, Piscataway, all of N.J.

[73] Assignee: Bell Communications Research, Inc., Morristown, N.J.

[21] Appl. No.: 168,612

[22] Filed: Jan. 31, 1994

[51] Int. Cl.⁶ .................................................. H04M 3/42
[52] U.S. Cl. ........................ 379/265; 379/201; 379/207; 379/211; 379/266; 379/230; 379/220; 379/229
[58] Field of Search .................................. 379/97, 88, 89, 379/67, 201, 207, 211, 212, 220, 230, 94, 10, 15, 27, 265, 266

[56] References Cited

U.S. PATENT DOCUMENTS

| | | | |
|---|---|---|---|
| 5,008,930 | 4/1991 | Gawrys et al. | 379/211 |
| 5,208,848 | 5/1993 | Pula | 379/97 |
| 5,241,580 | 8/1993 | Babson, III | 379/10 |
| 5,241,588 | 8/1993 | Babson, III et al. | 379/201 |
| 5,259,026 | 11/1993 | Johnson | 377/88 |
| 5,359,646 | 10/1994 | Johnson et al. | 379/27 |
| 5,361,295 | 11/1994 | Solomon et al. | 379/211 |

Primary Examiner—Jeffery Hofsass
Assistant Examiner—Scott Wolinsky
Attorney, Agent, or Firm—Leonard Charles Suchyta; Joseph Giordano

[57] ABSTRACT

A method and system for providing interactive capabilities in a network-based telephone system 100 a service control point (SCP) 102 for accessing a call processing record (CPR) and having an intelligent peripheral (IP) 104 for providing an intelligent interface between a caller 112 and the SCP 102. The IP 104 communicates with the SCP 102 through a peripheral interface (PI) 128. External systems 106 are accessed by SCP 102 through a generic data interface (GDI) 124 to obtain customer data. The GDI 124 keeps track of the data stored in the various external systems 106. Upon receiving a request for data, GDI 124 forms sub-requests, routes the sub-requests to the appropriate external systems 106, and returns a message containing the requested data.

20 Claims, 8 Drawing Sheets

NETWORK-BASED TELEPHONE SYSTEM HAVING INTERACTIVE CAPABILITIES

CROSS REFERENCE TO RELATED APPLICATIONS

This application is related to U.S. patent application Ser. No. 07/934,240, entitled System and Method for Creating, Transferring, and Monitoring Services in a Telecommunication Network, by Zaher A. Nazif et al.; and U.S. patent application Ser. No. 07/972,817, entitled "A method of Creating a Telecommunication Service Specification," by Susan K. K. Man et al. These applications are referred to together herein as "the incorporated patent applications." The contents of each of the foregoing patent applications is hereby incorporated by reference.

BACKGROUND OF THE INVENTION

The present invention relates generally to the field of network-based telephone systems, and more specifically to the problems of interaction between a caller and a network-based telephone system and accessing data from external systems.

The incorporated patent applications describe a system and method for creating customized telecommunication services and instantiating and maintaining the services in a network. The system includes a Service Provisioning and Creation Environment (SPACE®) application, which creates call processing records (CPRs). CPRs define how a received telephone call is processed for a particular customer. The CPRs are transferred to service control points (SCPs) to implement the services.

As explained in the incorporated patent applications, switches in the network route received calls to an SCP. A Multi-Services Application Platform (MSAP) in the SCP accesses a CPR based on a "key" associated with the call. MSAP processes the nodes of the CPR and issues corresponding call processing instructions back to the switch. The switch routes the call based on the instructions.

As described in the incorporated patent applications, while executing a CPR, the SCP may request information from the caller based on certain nodes. The type of information which the SCP can request is somewhat limited, however. For example, the SCP can request the caller to insert a PIN number. This limited interaction between a caller and the SCP may be inadequate to complete the call, requiring a service agent to intervene and handle the call manually. Manual call processing is typically slower and more costly than automated call processing.

As also described in the incorporated patent applications, MSAP cannot access information from external systems. Instead, MSAP can only access information which is available at the MSAP site. This information, however, may be inadequate to properly execute the CPR.

Accordingly, it is desirable to increase the intelligence of a system for processing telephone calls.

It is also desirable to increase the flexibility in a system for processing telephone calls.

It is also desirable to provide greater interaction between a caller and a system for processing telephone calls.

It is also desirable to provide greater accessibility to information from external systems by a system for processing telephone calls.

It is also desirable to augment the existing process of directing calls to service agents.

It is also desirable to route a caller to the appropriate agent based on information about the caller.

It is also desirable to provide routing of a call and its associated data to the appropriate agent.

It is also desirable to provide network reliability in routing a caller to the appropriate agent.

Additional desires of the invention will be set forth in the description which follow, and in part will be apparent from the description, or may be learned by practice of the invention. The advantages of the invention may be realized and obtained by means of the instrumentalities and combinations particularly pointed out in the appended claims.

DISCLOSURE OF THE INVENTION

To achieve the foregoing desires and objects, and in accordance with the purposes of the invention as embodied and broadly described herein, the present invention provides, in a network-based telephone system, such as an Advanced Intelligent Network (AIN), including an intelligent peripheral (IP), a service control point (SCP), and external data systems, a method of processing calls, comprising the steps of the IP receiving a call from a caller, the IP requesting call processing instructions from the SCP, the SCP accessing a call processing record, the SCP instructing the IP, based on the service logic, to collect information from the caller, and the SCP accessing account data, based on the service logic, from external data systems.

Further, the present invention provides a network-based telephone system for executing a call processing record having service logic associated with a received call from a caller comprising a service control point (SCP) for issuing instructions according to service logic of an accessed call processing record, an intelligent peripheral (IP) for interfacing the system with the caller according to instructions from the service control point, and external systems for providing access to data according to instruction from the service control point.

BRIEF DESCRIPTION OF THE DRAWINGS

The accompanying drawings, which are incorporated in and constitute a part of the specification, illustrate presently preferred implementations of this invention and, together with the general description given above and the detailed description of the preferred implementations given below, serve to explain the principles of the invention.

In the drawings.

BEST MODE FOR CARRYING OUT THE INVENTION

Figure 1:
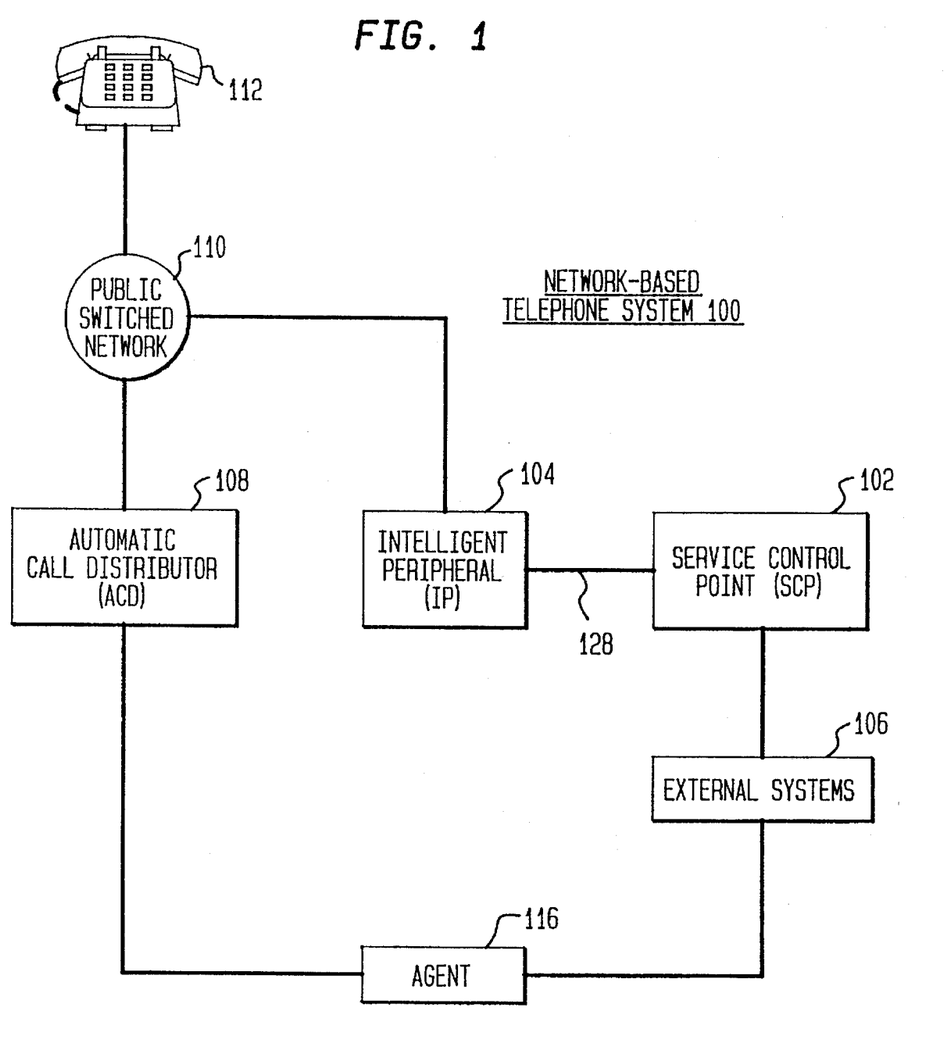
FIG. 1 is a block diagram of a network-based telephone system in accordance with the present invention.

As shown in FIG. 1, a preferred embodiment of a network-based telephone system 100, or Advanced Intelligent Network (AIN) 100, includes a public switched network 110, a plurality of telephones 112 (only one shown), automatic call distributor (ACD) 108, intelligent peripheral (IP) 104, service control point (SCP) 102, external systems 106, and a plurality of agents 116 (only one shown).

Public switched network 110 is connected to IP 104 and to ACD 108. ACD 108 is connected to agents 116. IP 104 is also connected to SCP 102, which is connected to external systems 106. Agents 116 are also connected to external systems 106.

A call placed by a caller on telephone 112 is received by public switched network 110 and forwarded to IP 104. In a preferred embodiment, the ACD 108 is an AT&T 5ESS Pinnacle ACD, however, any known type of ACD could be used.

One of the functions of the IP 104 is to interface as an intelligent speech peripheral with the caller on telephone 112. For example, IP 104 can preferably play digitized announcements to a caller, prompt the caller to enter call processing information, and collect call processing information. When a call is routed to IP 104 from public switched network 110, IP 104 requests instructions from SCP 102 on how to handle the call. As described in more detail below, the SCP 102 provides interface instructions to the IP 104 based on a call processing record. The caller-to-IP 104 connection, therefore, becomes an intelligent interactive communication, with the SCP 102 providing instructions to the IP 104 in response to information provided by the caller. The use of the SCP 102 in conjunction with IP 104 automates the call processing and substantially reduces agent time for handling routine tasks.

Preferably, IP 104 also provides additional functions such as automatic outbound dialing, where IP 104 places a call to an outside telephone 112 according to instructions received from SCP 102.

In a preferred embodiment, IP 104 is a Periphonics VPS 9000 or Bellcore Intelligent Services Peripheral (ISP), vers. 1.0.

External systems 106 preferably include databases or other network-based systems, which contain data that is useful in processing a call, including, for example, account status data, repair information, customer profile data, and ordering information.

Account status data indicates whether a customer is in good standing or whether the customer's service has been suspended for nonpayment. Repair information indicates the repairs that have been made to a particular telephone line, whether a particular line is in service, and the type of problems a particular line is experiencing. Customer profile data contains information about the customer that may be useful in directing the customer's call, such as the type of services that are installed and the geographical location of his telephone line. Ordering information may include, for example, the costs of services and the availability of services to particular customers.

As described above, ACD 108 may also route the call to an agent 116 according to instructions received by SCP 102. Agent 116 may be a regular service agent capable of handling various customer needs or a specialized service agent capable of handling specific customer needs. Based on information received from IP 104 and external systems 106, SCP 102 may direct ACD 108 to route the call to an appropriate agent 116. For example, a caller may be routed to the collections department if the caller's account has been suspended for non-payment. Or, a caller may be routed to an agent specializing in "work-at-home" accounts if the caller's line is used in a home office. In handling a call, agent 116 may have access to data stored in external systems.

Figure 2:
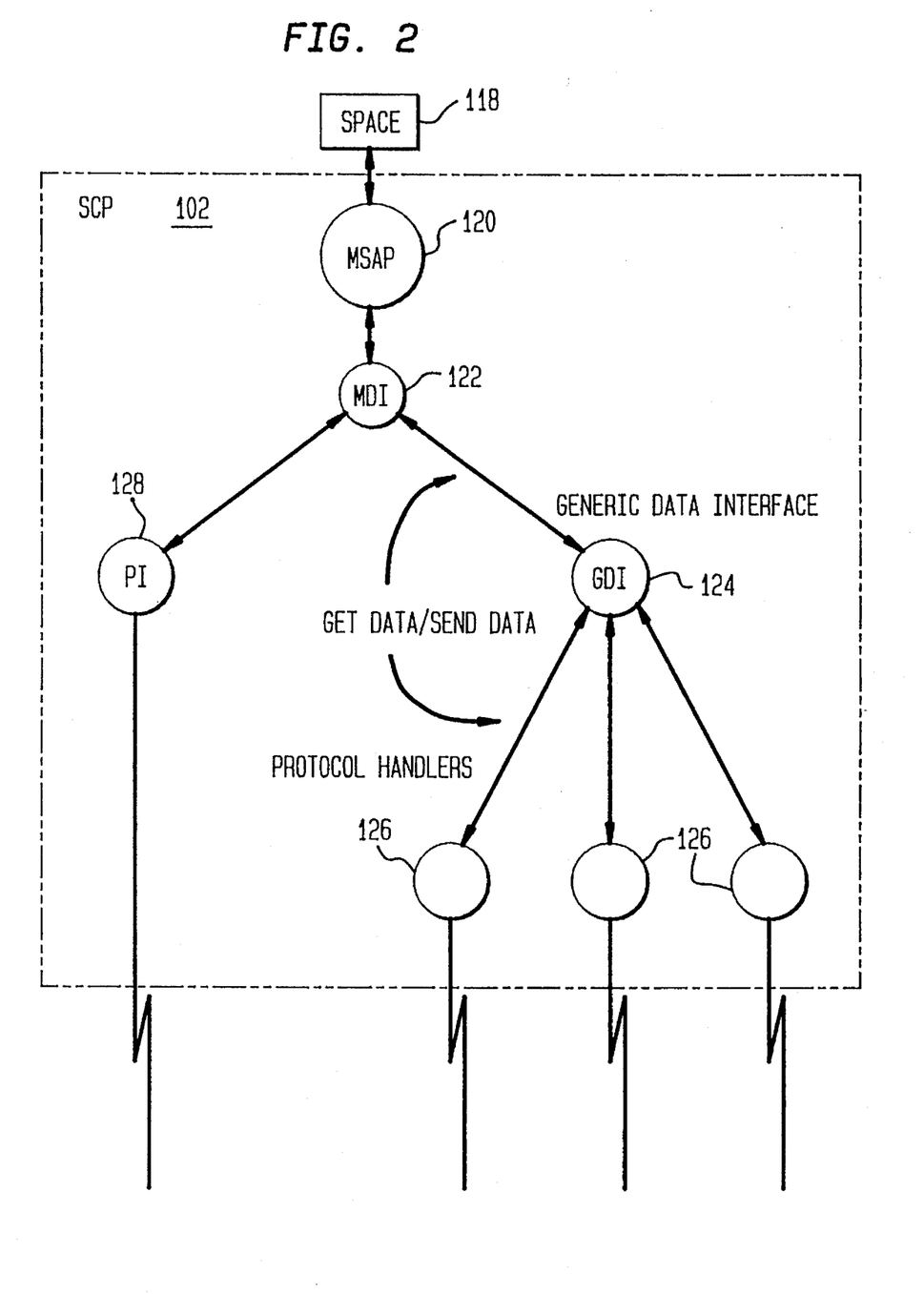
FIG. 2 is a block diagram of a service control point (SCP) in accordance with the present invention.

FIG. 2 shows a block diagram of SCP 102 architecture according to a preferred embodiment of the present invention. Service Processing and Creation Environment (SPACE®) application 118 interfaces with Multi-Services Application Platform (MSAP) application 120. MSAP 120 communicates with Message Delivery Interface (MDI) 122, which delivers messages from MSAP 120 to either peripheral interface (PI) 128 or generic data interface (GDI) 124.

PI 128 interfaces IP 104 to SCP 102 and allows these two devices to communicate. GDI 124 transmits requests for data to the appropriate external systems 106 via protocol handlers 126 and packages the data received from the external systems 106 into a message to be transmitted to and used by MSAP 120. PI 128 and GDI 124 are described in detail below.

MSAP 120, an application that is resident in the SCP 102, executes the service logic of the accessed call processing record and issues instructions to the other elements of the system 100.

PI 128 establishes and maintains a data network communication link between IP 104 and SCP 102. PI 128 also handles asynchronous transmission of messages between IP 104 and SCP 102. Further, PI 128 translates messages into a format understood by either IP 104 or SCP 102. In a preferred embodiment, the message formats supported by PI 128 are described in publicly published Bellcore Documents TR-TSY-000402, July 1989 (hereinafter TR402 format) and TA-NWT-001129, October 1992 (hereinafter TA1129+ format), which are understood by IP 104 and SCP 102, respectively. However, other message formats could be used by IP 104 and SCP 102.

During normal operation, PI 128 is simultaneously waiting for messages from IP 104 and MSAP 120. Messages received by PI 128 are added to a queue 129, while messages transmitted from PI 128 are removed from the queue 129, as depicted in FIG 3.

Figure 3:
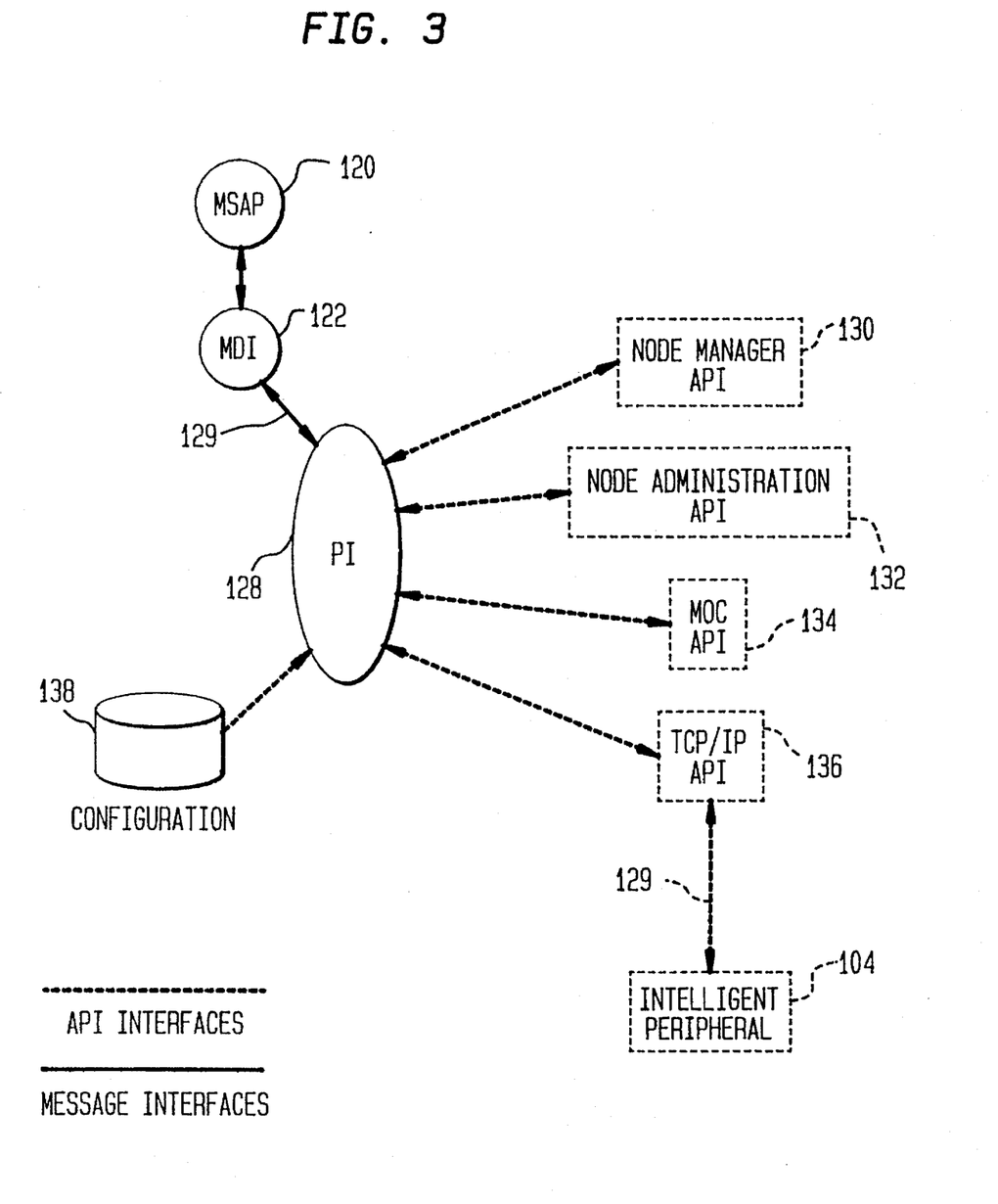
FIG. 3 shows the internal interfaces of a peripheral interface (PI) in accordance with the present invention.

FIG. 3 shows the internal interfaces of PI 128, including Node Manager Application Programming Interface (API) 130, Node Administration API 132, Maintenance Operations Console (MOC) API 134, Transmission Control Point/Internet Protocol (TCP/IP) API 136, Configuration File 138, and Message Delivery Interface (MDI) 122.

Node Manager API 130 is responsible for maintaining the reliability of SCP 102 by monitoring the status of the nodes in SCP 102. Node Administration API 132 contains information regarding the configuration of SCP 102 such as the addresses of each IP 104 connected to SCP 102. MOC API 134 interfaces a computer terminal, not shown in the drawings, with SCP 102 to permit, for example, a technician to conduct maintenance on SCP 102. TCP/IP API 136 provides an interface between SCP 102 and IP 104 using the TCP protocol.

Configuration File 138 contains information relevant to the operations of PI 128. This information includes parameters for configuring PI 128, such as identifying the addresses of IPs 104 and specifying the priority of a message in queue 129. Changes to the configuration file 138 are preferably effected upon initialization of PI 128.

Figure 4:
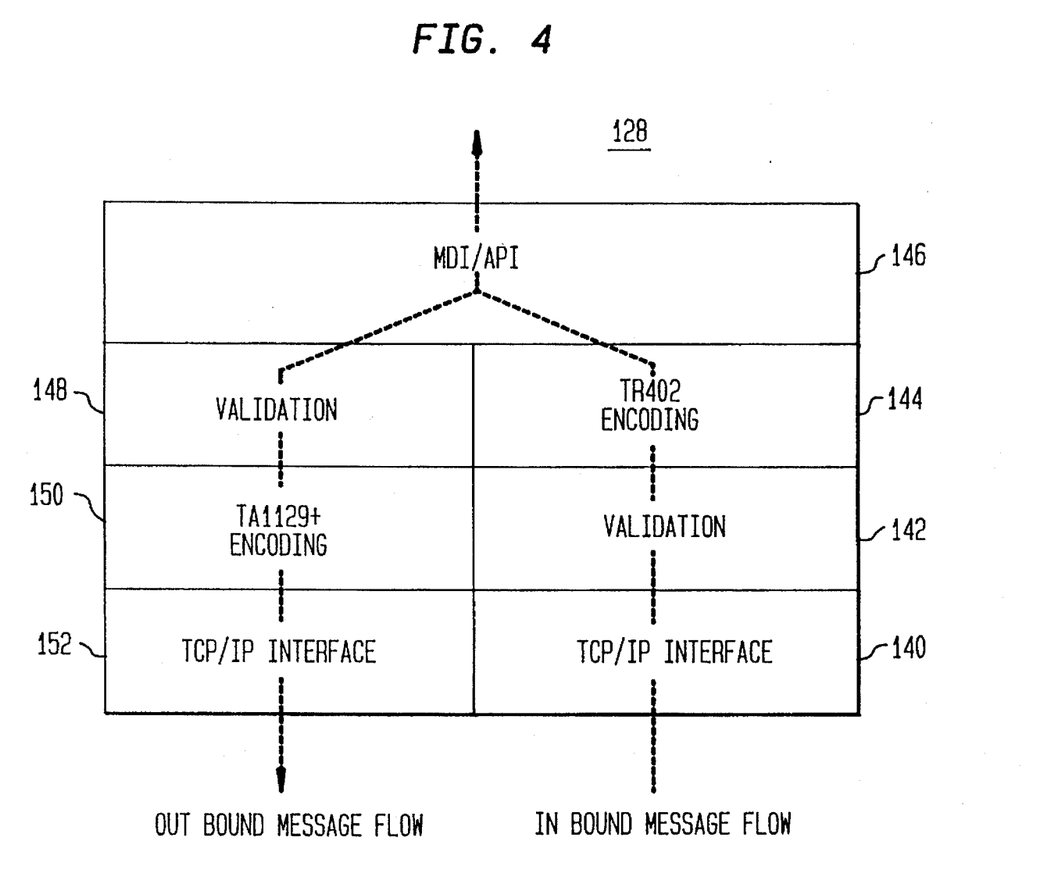
FIG. 4 is a schematic representation of software modules corresponding to a PI in accordance with the present invention.

In a preferred embodiment, PI 128 is implemented as software. FIG. 4 depicts a block diagram of the preferred software modules of PI 128. In PI 128, a message is received by module 140 from IP 104. The received message is then validated by module 142 and encoded by module 144 in a format understandable by MSAP 120. Module 146 transmits and receives messages from MSAP 120 through MDI 122. Module 148 validates a message received from MSAP and module 150 encodes the message in a format understood by IP 104. Module 152 provides the message to IP 104.

In processing a received message, PI 128 determines whether a translation is required. If so, PI 128 decodes the received message and determines whether the message is valid. PI 128 then converts the message to a format understood by the receiving device using conversion tables (not shown). For example, a message being received by IP 104 from SCP 102 is converted from TR402 format into TA1129+ format and vice-versa.

If PI 128 receives an invalid message from IP 104, the message is dropped and further processing of the message ceases. Timers in IP 104 then either resend the message or transfer the call. If PI 128 receives an improperly formatted message from MSAP 120, PI 128 returns an error message to MSAP 120.

Figure 5:
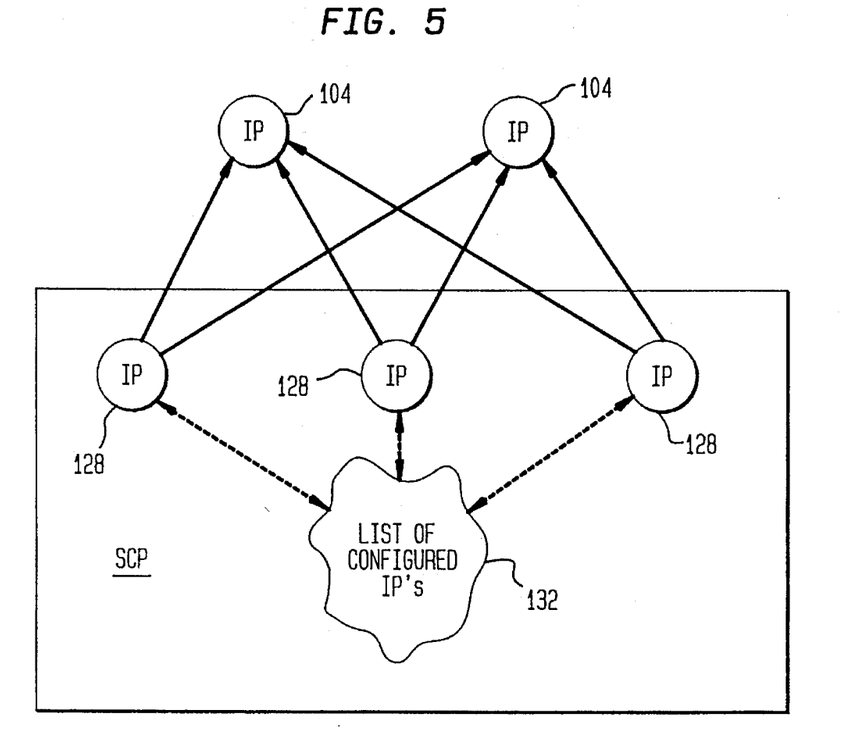
FIG. 5 shows a configuration having a plurality of intelligent peripherals (IPs) interfaced with a plurality of PIs in accordance with a preferred embodiment of the present invention.

FIG. 5 shows a preferred embodiment of the present invention having redundant connections between a plurality of IPs 104 and SCP 102 to provide high system reliability. SCP 102 distributes transactions in a "round-robin" fashion to each of a plurality of PIs 128. PIs 128 are configured to make redundant connections with one or more IPs 104. Thus, in the case of a failed connection, a message can still be transmitted between IP 104 and SCP 102.

Each PI 128 attempts to keep all configured connections, including redundant connections, active at all times. PI 128 logs the general status of each of its circuit connections, indicating whether the connection is good, degraded, or poor. A good connection indicates that all the configured connections are active; a degraded connection indicates that at least one, but not all, connections have failed; and a poor connection indicates that all connections have failed.

When any connections have failed, a periodic timer mechanism in PI 128 causes PI 128 to make another attempt to establish the connection after a predetermined time. When all the configured circuits are active, PI 128 deactivates its periodic timer mechanism. When an active circuit returns an unexpected error, that circuit is considered failed and the periodic timer of PI 128 reactivates and attempts are made to reestablish the circuit. A badly formed message received over a circuit is considered to be a circuit failure, resulting in activation of the periodic timer of PI 128.

GDI 124 gives MSAP 120 transparent access to information stored in external systems 106 by allowing MSAP 120 to request information without knowledge of the source of that information.

Figure 6:
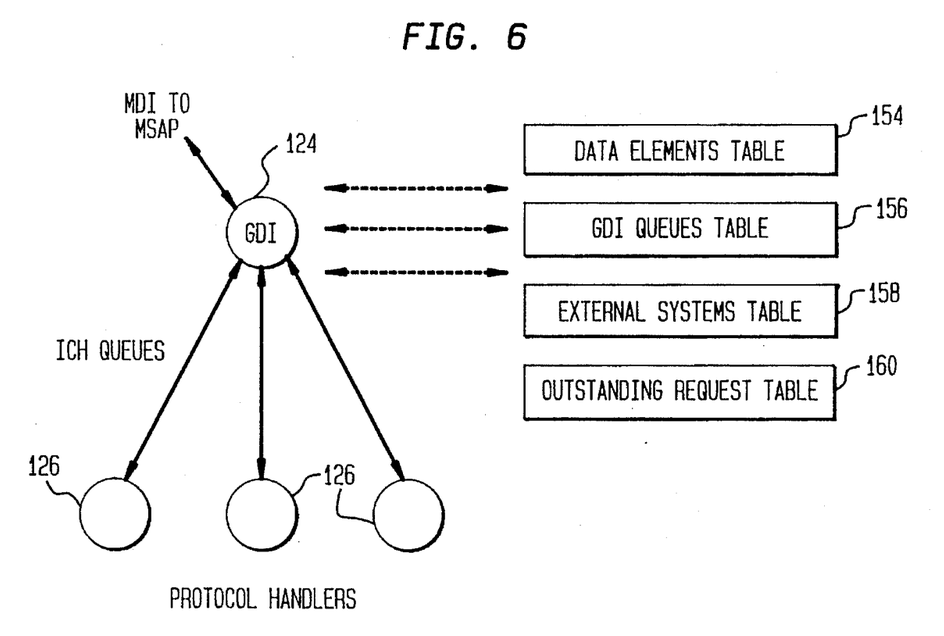
FIG. 6 illustrates internal tables which interface with a generic data interface (GDI) in accordance with the present invention.

FIG. 6 illustrates internal tables stored in GDI 124 for handling requests for information. These tables include Data Elements Table 154, GDI Queues Table 156, External Systems Table 158, and Outstanding Request Table 160. Data Elements Table 154 is used by GDI 124 to forward a request for data to the appropriate external systems 106. GDI Queues Table 156 is used by GDI 124 and protocol handlers 126 to determine what queue names to use for exchanging messages. External Systems Table 158 is used by protocol handlers 126 to obtain addressing information for communicating with external systems. Outstanding Request Table 160 is used to maintain a list of outstanding requests by GDI 124.

Protocol handlers 126 manage the physical and logical connections to external systems 106 and interact with external systems 106 to retrieve information. In a preferred embodiment, each external system 106 has a corresponding protocol handler 126.

Figure 7:
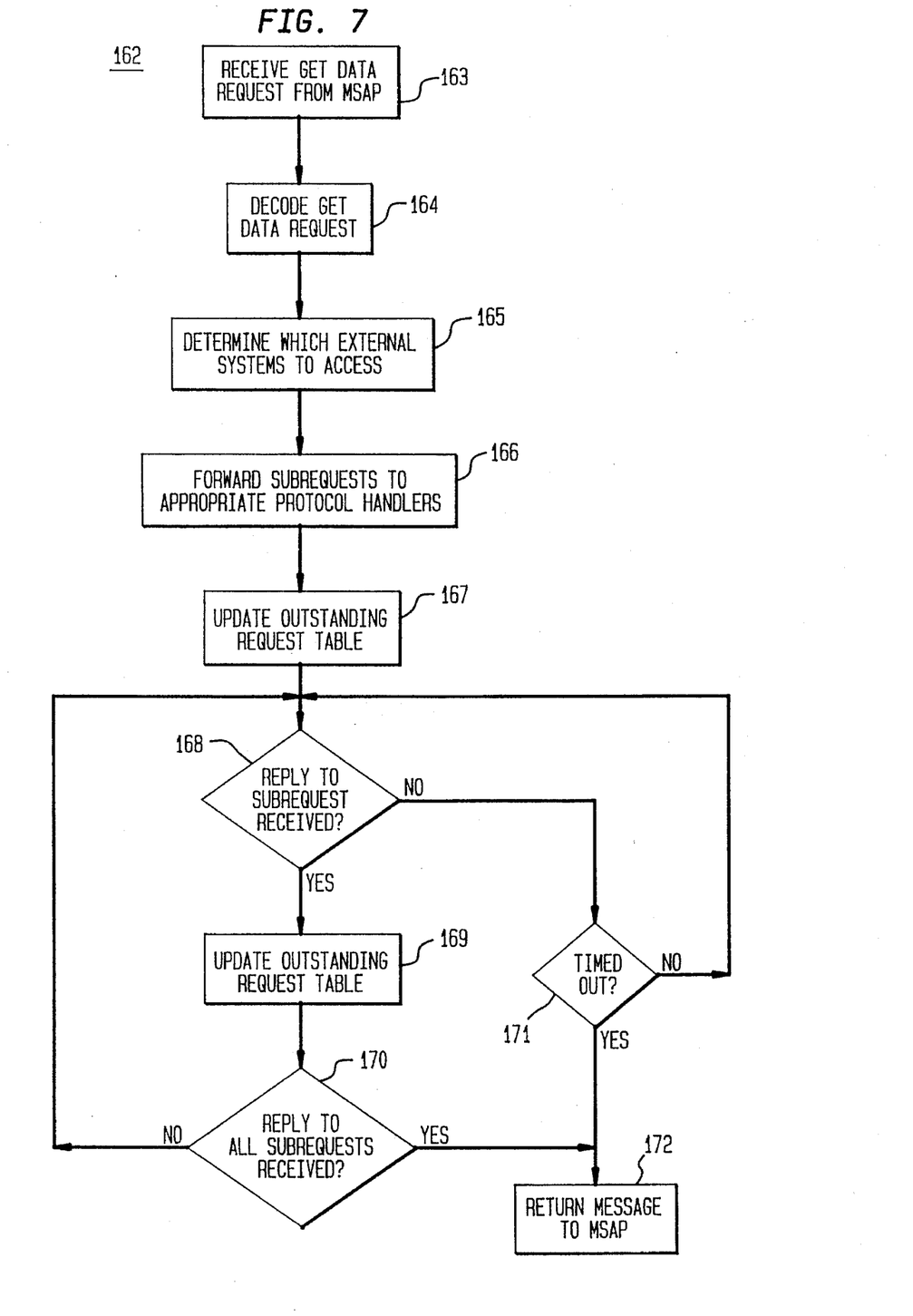
FIG. 7 is a flowchart illustrating an operation of a GDI in accordance with a preferred embodiment of the present invention.

As shown in FIG. 7, flowchart 162 depicts how GDI 124 handles a request for data. Initially, GDI 124 receives a GetData request, described in detail below, from MSAP 120 (step 163). GDI 124 decodes the GetData request to determine the specific data elements being requested by MSAP 120 (step 164). Using Data Elements Table 154, GDI 124 determines which external systems 106 should be accessed to obtain the requested data elements (step 165). GDI 124 then forwards "sub-requests" requesting the data elements to protocol handlers associated with the appropriate external systems (step 166). Outstanding Request Table 160 is updated to keep track of the outstanding "sub-requests" (step 167).

GDI 124 then determines whether a reply has been received (step 168). If a reply is received by GDI 124 from external systems 106, Outstanding Request Table is updated to keep track of the partial completions (step 169).

GDI 124 then determines if all of the replies to the sub-requests have not been returned (step 170). If not, GDI 124 waits for additional replies. If all of the replies have been received, GDI 124 returns the completed message to MSAP 120 (step 172).

If at step 168 GDI 124 determines that a reply has not been received, the message will also be returned to MSAP 120 (step 172) if a predetermined time passes (step 171). Thus, a message is returned to MSAP 120 when all of the outstanding sub-requests have been responded to or timed out.

Figure 8:
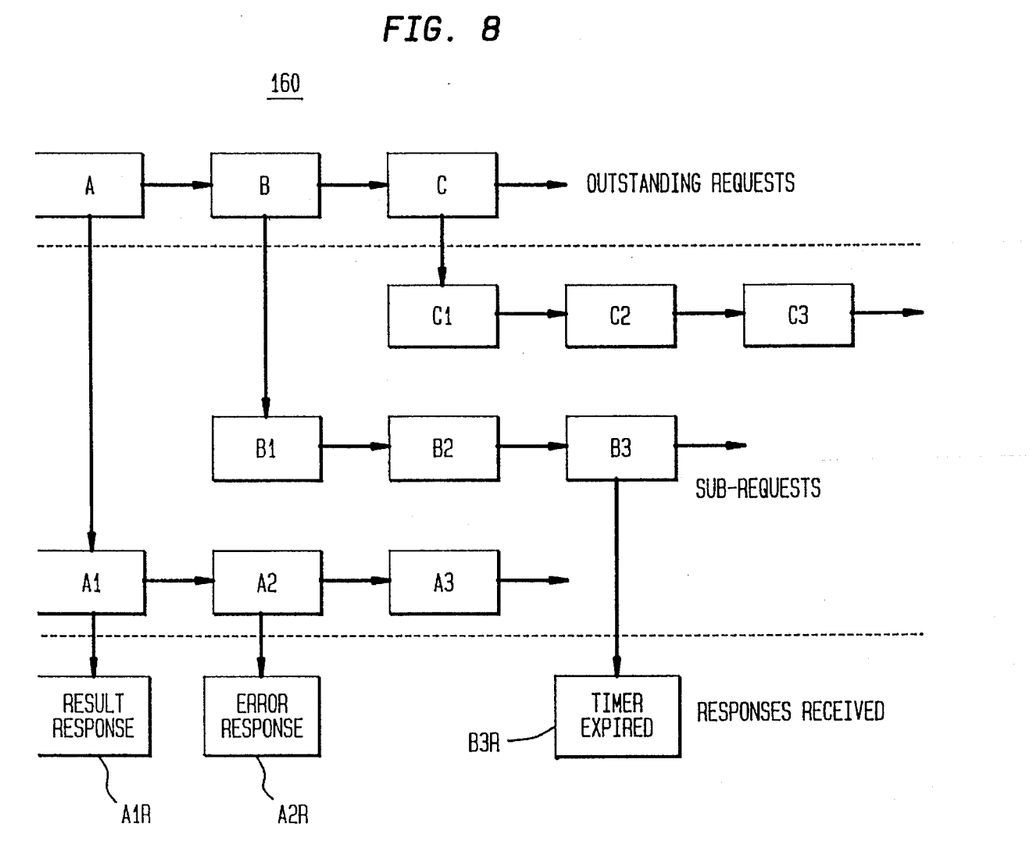
FIG. 8 illustrates sub-requests in an Outstanding Request Table in accordance with the present invention.

FIG. 8 depicts the GDI Outstanding Request Table 160. Blocks A, B, and C represent outstanding requests received by GDI 124 from MSAP 120. Blocks A1, A2, and A3; B1, B2, and B3; and C1, C2, and C3 represent sub-requests created from outstanding requests A, B, and C, respectively. Blocks A1R, A2R, and B3R represent responses received by GDI 124 in response to sub-requests A1, A2, and B3, respectively.

Outstanding Request Table 160 is constructed and updated as each request for information from MSAP 120 is received by GDI 124. Upon receiving a request from MSAP 120, GDI 124 creates sub-requests, which are forwarded to the appropriate protocol handler.

GDI 124 awaits a response for each outstanding sub-request. Three types of responses may be stored in Outstanding Request Table 160. First, GDI 124 may store response A1R from external systems 106, indicating that a result was received in response to the sub-request. Second, GDI 124 may store response A2R from external systems 106, indicating that an error was received from external systems 106. Such an error may indicate that external systems 106 are unable to process the sub-request. Finally, GDI 124 may store response B3R, indicating that no response was received from external systems 106 within a predetermined time.

As explained in the incorporated patent applications, nodes are the basic units that define the logical operations to be performed during call processing. MSAP 120 processes the nodes and issues corresponding requests or instructions to the other elements of system 100. The incorporated patent applications describe various nodes supported by MSAP 120 including GetData, SendData, and WaitForEvent nodes. In a preferred embodiment of the present invention, the GetData, SendData, and WaitForEvent nodes may be modified as described below. Also, the present invention contemplates a TransferCall node, also described below.

The GetData node allows MSAP 120 to request data from external systems 106 for a particular account. A GetData request issued by MSAP 120 includes a handle call variable, accounts ID, and a list of call variables. The handle call variable identifies a GetData request and is used to retrieve the requested information and check the status of the request. The account ID identifies the caller's account. The list of call variables specify the data requested by MSAP 120 from the external systems 106.

Upon receiving a GetData request from MSAP 120, GDI 124 determines which external systems 106 contain the requested data as described above. GDI 124 formats and transmits sub-requests based on the GetData request received from MSAP 120 to the appropriate external systems. GDI 124 waits for a response for each of the sub-requests before returning all of the requested information to MSAP 120. If GDI 124 does not receive a reply to all of the sub-requests after a predetermined time, an error indication is returned to MSAP 120 along with the data that was received. While information may be returned to MSAP 120 from GDI 124, the information is not available for use by MSAP 120 until after MSAP 120 executes a WaitForEvent node.

The SendData node allows MSAP 120 to send data, such as account data, to external systems 106. A SendData request issued by MSAP 120 to external systems 106 contains a handle call variable, account ID, and a list of call variables along with corresponding data. The handle call variable identifies a SendData request and is used to obtain the status of the request. The information corresponding to the list of call variables is stored in the external systems 106 according to the account ID.

Upon receiving a SendData request from MSAP 120, GDI 124 determines to which external system 106 it should send the data. GDI 124 formats the data from the received SendData request and transmits the formatted data to the appropriate external systems protocol handlers. GDI 124 waits for positive acknowledgment from the protocol handlers indicating that the data has been accepted before sending a status reply to MSAP 120. However, the status of the SendData request is not available to MSAP 120 until after MSAP 120 executes a WaitForEvent node.

The WaitForEvent node gives MSAP 120 access to the data or status of a GetData or SendData request. The WaitForEvent instruction specifies a handle call variable, which corresponds to a handle call variable specified in a GetData or SendData request. All requests returned to MSAP 120 from a GetData or SendData request are not available to MSAP 120 until after MSAP 120 executes a WaitForEvent node. When a WaitForEvent instruction has been issued, no further instructions are executed by MSAP 120 until the requested information has been returned. When a reply has been returned, the information is assigned to the call variables specified in the request and the status of the request is returned.

While the GDI 124 is retrieving the requested information, MSAP 120 may issue additional instructions to IP 104, for example, to obtain additional information from the caller or to play digitized messages before a WaitForEvent request is issued. In this way, caller 112 is not simply waiting for MSAP 120 to receive a reply to a request.

The TransferCall node allows MSAP 120 to instruct public switched network 110 to route a call to an agent 116, together with data about caller 112. The TransferCall instruction, preferably including a transfer number and account number, can be transmitted, for example, to ACD 108 where the call is routed to a specialized agent 116 identified by the transfer number together with account information about the caller 112.

Figure 9:
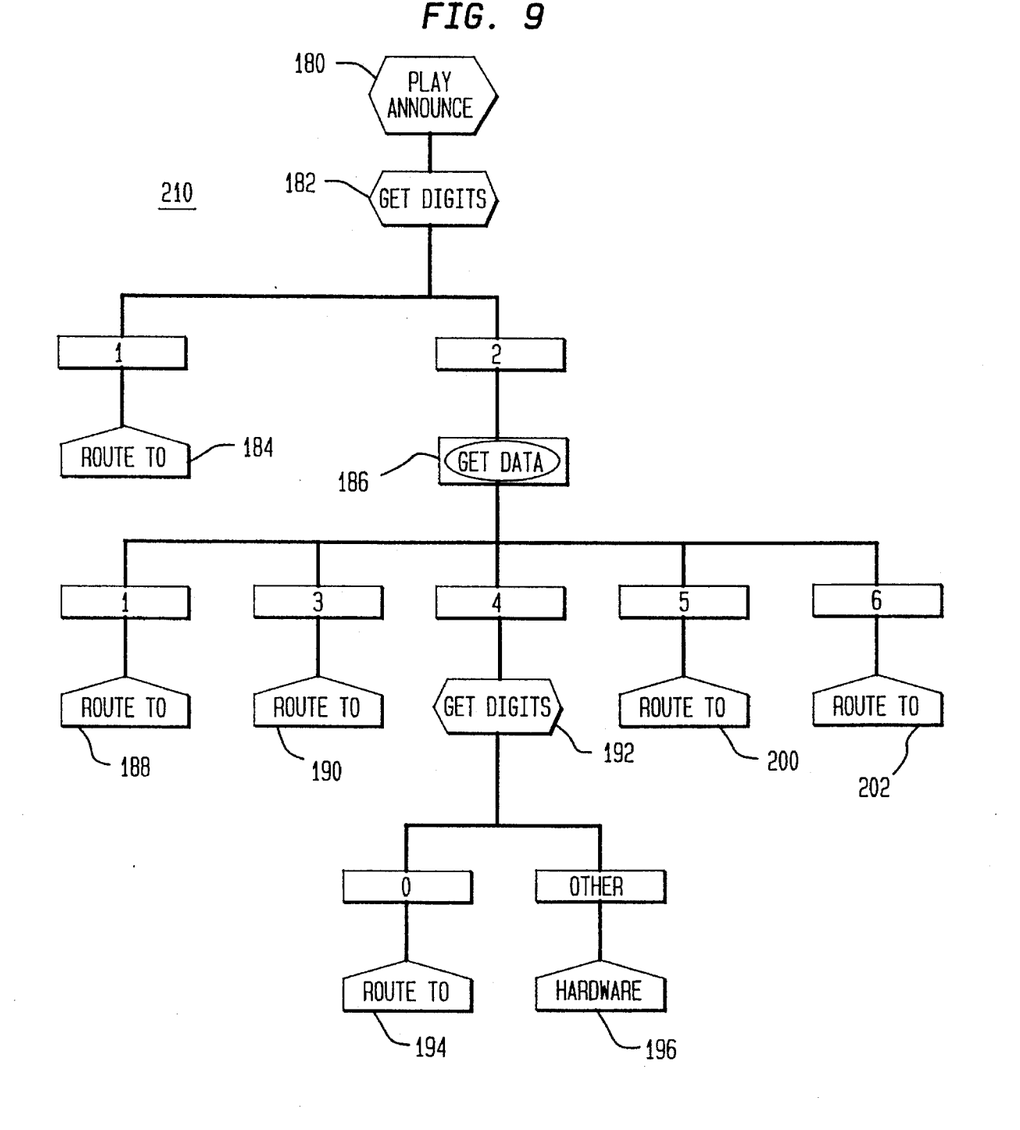
FIG. 9 illustrates an example of a call processing record in accordance with the present invention.

To illustrate the operation of system 100, FIG. 9 shows an example of a call processing record designated by numeral 210. In this example, call processing record 210 routes the caller to a "specialized" agent based on the caller's profile.

After a received call has been routed to IP 104, IP 104 requests call processing instructions from SCP 102. Based on predetermined information in the call, such as the account number or telephone number, SCP 102, under the control of MSAP 120, executes a corresponding call processing record 210.

As shown in the example of FIG. 9, SCP 102 instructs IP 104 to PlayAnnouncement 180, welcoming the caller with a digitized announcement. GetDigits node 182 causes IP 104 to ask the caller to enter the caller's account number or telephone number. If the result is a "1", indicating that the entered telephone number is in error, MSAP 120 executes RouteTo node 184, causing the call to be routed to a "regular" (i.e. non-specialized) representative. If the result is "2", indicating that the telephone number has been verified by MSAP 120, MSAP 120 executes a GetData node 186, requesting customer profile information from GDI 124.

If the result to the request is a "1", indicating that the caller is a particular market customer, RouteTo node 188 is executed, routing the caller to an agent specialized in handling the particular market customer. If the result to the request is a "2", indicating that the caller "works at home", RouteTo node 190 is executed, routing the caller to an agent specialized in handling customers who "work at home".

If the result to the request is a "4", indicating that the account is a residential account, GetDigits node 192 is executed, causing IP 104 to prompt the caller to choose between a residential agent or automated application. If the caller inputs a "0" choosing a residential agent, the caller is routed to an agent specializing in residential accounts by RouteTo node 194. If the caller presses any other key, indicating automated applications, Handover node 196 is executed, causing the call to be handled by another call processing record.

If the result to the request is a "5", indicating that the account has been suspended for nonpayment, RouteTo node 200 is executed, routing the call to the collections department. Finally, if the result to the request is a "6", indicating that the customer profile does not satisfy any of the other choices, the caller is routed to a "regular" representative by RouteTo node 202.

While there has been illustrated and described what are at present considered to be preferred implementations and methods of the present invention, it will be understood by those skilled in the art that various changes and modifications may be made, and equivalents may be substituted for elements thereof without departing from the true scope of the invention.

In addition, many modifications may be made to adapt a particular element, technique or implementation to the teachings of the present invention without departing from the central scope of the invention. Therefore, it is intended that this invention not be limited to the particular embodiments and methods disclosed herein, but that the invention include all embodiments falling within the scope of the appended claims.

We claim:

1. In a network-based telephone system including an intelligent peripheral (IP), service control point (SCP), and external data systems, wherein the SCP includes a Multi-Services Application Platform (MSAP) for processing a call processing record (CPR), a peripheral interface (PI) for interfacing the SCP with the IP, and generic data interface (GDI) for interfacing the SCP with the external data systems, a method of processing calls, comprising the steps of:

(a) the IP receiving a call from a caller;
   (b) the IP requesting call processing instructions from the SCP;
   (c) the MSAP accessing a corresponding CPR having service processing logic;
   (d) the SCP instructing the IP, based on the service processing logic, to collect information from the caller; and
   (e) the MSAP retrieving account data from the external data systems via the GDI based on the service processing logic.

2. The method according to claim 1, wherein the account data retrieved from the external data systems includes account status data, repair information, customer profile data, and ordering information.

3. The method according to claim 1, further including the step of:

(f) routing the call and the account data retrieved from the external data systems to a predetermined agent.

4. The method according to claim 1, wherein the step of the MSAP retrieving account data from the GDI comprises the steps of:

MSAP issuing a data request to the GDI;
   the GDI forming sub-requests from the issued data request;
   the GDI forwarding the sub-requests to the appropriate external systems;
   the GDI receiving replies to the sub-requests; and
   the GDI returning a message to the MSAP containing the requested data.

5. The method according to claim 4, wherein the step of the MSAP retrieving account data further includes the step of:

the SCP issuing a wait request to access the returned message.

6. In a network-based telephone system including an intelligent peripheral (IP), service control point (SCP), and external data systems, wherein the SCP includes a Multi-Services Application Platform (MSAP) for processing a call processing record (CPR), a peripheral interface (PI) for interfacing the SCP with the IP, and a generic data interface (GDI) for interfacing the SCP with the external systems, a method of processing calls, comprising the steps of:

(a) the IP receiving a call from a caller;
   (b) the IP requesting call processing instructions from the SCP;
   (c) the MSAP accessing a corresponding CPR having service processing logic;
   (d) the SCP instructing the IP, based on the service processing logic, to collect information from the caller; and
   (e) the MSAP sending account data to the GDI, based on the service processing logic.

7. The method according to claim 6, wherein the step of the MSAP sending account data comprises the steps of:

the SCP issuing a send request to the GDI;
   the GDI forming sub-requests in response to the received send request;
   the GDI forwarding the sub-requests to the appropriate external systems;
   the GDI receiving status information concerning each sub-request; and
   the GDI returning a message to the SCP containing a status of the send request.

8. The method according to claim 7, wherein the step of the MSAP sending account data further includes the step of:

the SCP issuing a wait request to access the returned message.

9. A network-based telephone system for processing telephone calls comprising:

a service control point (SCP) for issuing instructions according to service logic of an accessed call processing record (CPR);
   an intelligent peripheral (IP) interfacing the system with a caller and communicating with the caller based on instructions from the SCP; and
   external systems responsive to requests from the SCP for providing data to the SCP,
   said SCP including:
      a peripheral interface (PI) for interfacing the SCP with the IP; and
      a generic data interface (GDI) for transmitting customer data between the SCP and the external systems.

10. The system according to claim 9, wherein the data provided by the external systems includes account status data, repair information, customer profile data, and ordering information.

11. The system according to claim 9, wherein the IP plays messages and receives caller information.

12. The system according to claim 9, wherein the SCP further includes:

a Multi-Services Application Platform (MAP) for executing a CPR and issuing corresponding call processing instructions.

13. The system according to claim 12, wherein the GDI includes means for receiving a data request from the MSAP requesting information, forming sub-requests to be forwarded to the appropriate external systems, and returning a single message to the MSAP containing the requested information.

14. The system according to claim 12, wherein the GDI includes means for receiving a send request from the MSAP, forming sub-requests to be forwarded to the appropriate external systems, and returning a single message to the MSAP containing a status of the send request.

15. The system according to claim 12, wherein the SCP further includes:

a Message Delivery Interface (MDI) for delivering messages among the MSAP, the GDI, and the PI.

16. The method of processing a phone call from a caller using services of an Advanced Intelligent Network (AIN), comprising the steps, executed by the AIN, of:

receiving the phone call;

accessing from a call processing record service logic which specifies handling of the phone call;

obtaining account and service information from the caller according to the service logic;

obtaining account information from external systems according to the service logic; and routing the phone call with the account information obtained from the caller and external systems to an appropriate agent.

17. In a network-based telephone system including an intelligent peripheral (IP), a service control point (SCP), and external data system, a method of processing calls, comprising the steps of:

(a) receiving a call from a caller at an IP;

(b) requesting call processing instructions from the SCP;

(c) the SCP accessing a call processing record having service logic based on a key;

(d) the SCP instructing the IP, based on the service logic, to collect information from the caller; and (e) the SCP retrieving data, based on the service logic, from an external data system.

18. The method according to claim 17, wherein the data retrieved from an external data system includes customer profile information associated with the caller.

19. The method according to claim 18, further including the step of:

(f) routing the call to an agent based on the customer profile information.

20. A network-based telephone system for executing a call processing record having service logic associated with a received call from a caller comprising:

a service control point for issuing instructions according to the service logic of the call processing record;

an intelligent peripheral for interfacing the system with the caller according to the instructions from the service control point;

a peripheral interface for interfacing the service control point with the intelligent peripheral;

an external system for providing data; and a generic data interface for transmitting data between the service control point and the external system according to the instructions from the service control point.

* * * * *

UNITED STATES PATENT AND TRADEMARK OFFICE
CERTIFICATE OF CORRECTION

PATENT NO. : 5,519,772
DATED : May 21, 1996
INVENTOR(S) : A.A Akman- P.J. Donnelly- S.A. Hollenbach - M.A. Kret It is certified that error appears in the above-identified patent and that said Letters Patent is hereby corrected as shown below:

In the drawing

Fig.5 of the drawing, change "IP" in elements 128 to -- PI --.

Signed and Sealed this

Twenty-fifth Day of May, 1999

Attest:

Q. TODD DICKINSON

*Attesting Officer*        Acting Commissioner of Patents and Trademarks